United States Patent [19]

Maglia, deceased

[11] 4,361,130
[45] Nov. 30, 1982

[54] GLASS SHEET SHAPING AND TRIMMING (GROZING) TOOL AND METHOD OF USE

[75] Inventor: Andrew R. Maglia, deceased, late of Detroit, Mich., by Concetta D. Maglia, executrix

[73] Assignees: Mark Talaba, Birmingham; Angela S. Maglia, Royal Oak, both of Mich.

[21] Appl. No.: 201,424

[22] Filed: Oct. 28, 1980

[51] Int. Cl.³ .............................................. B28D 5/04
[52] U.S. Cl. ................................. 125/36; 51/205 R; 51/330; 51/283 E; 225/103
[58] Field of Search ............. 51/205 R, 283 R, 283 E, 51/330; 81/5.1 R, 5.1 A, 425; 225/93, 103; 125/36

[56] References Cited

U.S. PATENT DOCUMENTS

| | | | |
|---|---|---|---|
| 891,061 | 6/1908 | Hansen | 81/5.1 R |
| 2,566,909 | 9/1951 | Cristoval | 51/330 |
| 2,679,776 | 6/1954 | Filip | 81/5.1 R |
| 2,736,218 | 2/1956 | Atkeson | 81/5.1 R |
| 3,329,001 | 7/1967 | Ringzelli | 51/205 R |

FOREIGN PATENT DOCUMENTS 190414  7/1956  Austria .............................. 51/205 R Primary Examiner—Harold D. Whitehead
Attorney, Agent, or Firm—Tan C. McLeod

[57] ABSTRACT

A tool for rapidly nibbling at an edge of a glass sheet to shape (groze) the edge without splitting or cracking the sheet is described. The tool has hinged jaw surfaces which are shaped in a V so as to contact only corners at the edge when the jaws are moved towards each other. The tool is used to repeatedly nibble single flakes of glass from the edge and thus rapidly form the desired contour. The tool is particularly adapted to trimming or shaping an edge of stained glass pane for windows and the like, as well as for trimming irregular edges or excess material from sheet window glass which has been scored and then broken.

9 Claims, 4 Drawing Figures

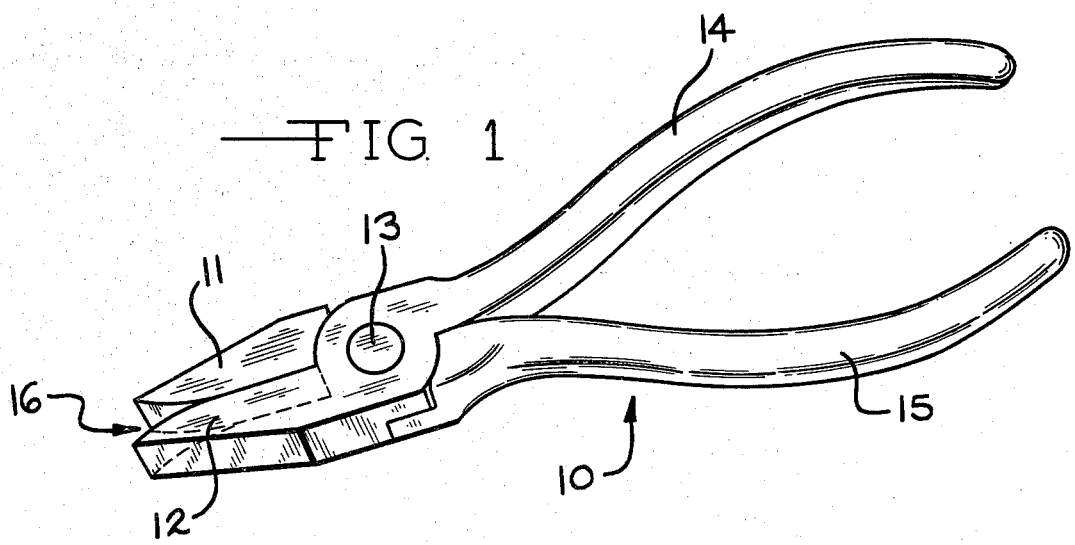
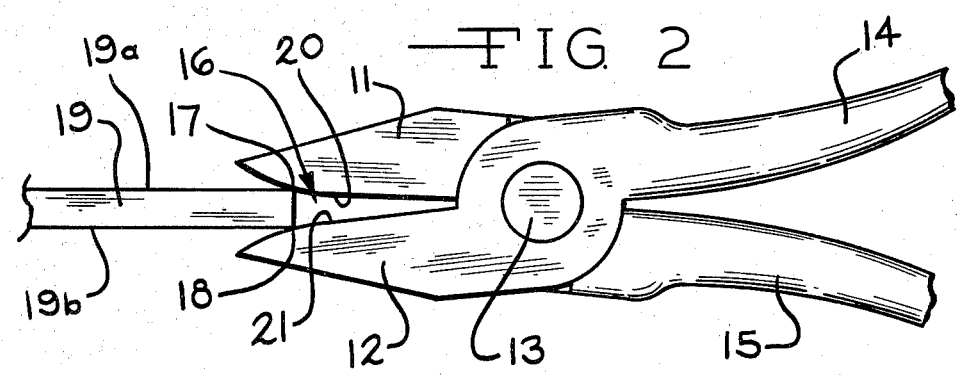
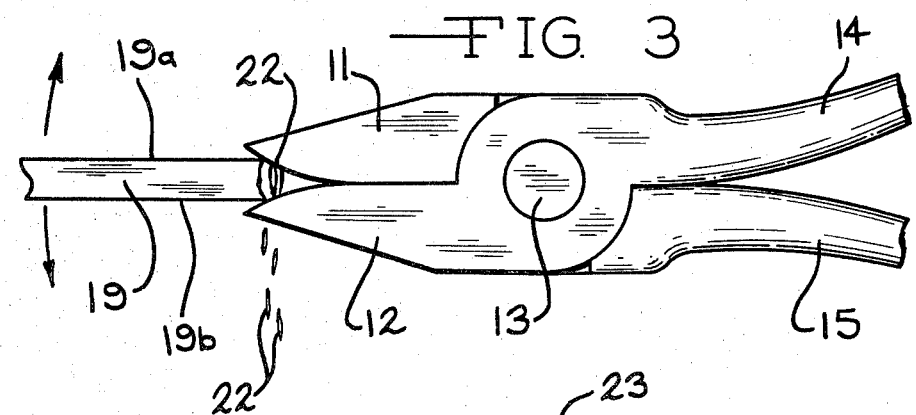
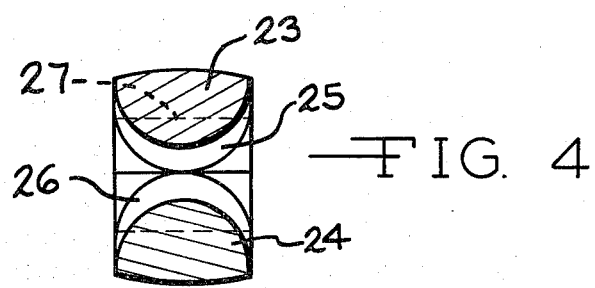

GLASS SHEET SHAPING AND TRIMMING (GROZING) TOOL AND METHOD OF USE

SUMMARY OF INVENTION

The present invention relates to an improved tool for shaping and trimming sheet glass. In particular it relates to a tool which can rapidly remove material from an edge of a glass sheet by repeatedly nibbling off small flakes of glass and without cracking the sheet.

PRIOR ART

The art of forming stained glass windows and the like is very old. In general, panes of colored glass are cut to shape and then are leaded or otherwise fixed into place to form the work of art. Usually the pane is roughly shaped using a wheel cutter to score the glass and then the glass is cracked along the score line. Sometimes further cutting or trimming of the glass is required to finish shaping it. Also, window glass will occasionally break irregularly such that the edge requires straightening to remove an irregularity. In either case seasoned glass tends to break irregularly. In addition, glass panes which have been scored and broken, and subsequently found to be slightly oversized, are difficult to trim to size when the amount of material to be removed is less than the thickness of the glass ($\frac{1}{8}$" from a $\frac{1}{8}$" thick piece of glass, etc.)

The prior art has used shaping tools to remove material from the edge of the glass which are usually referred to as "grozing" irons or pliers. The iron has a square edged notch into which the edge of the glass is inserted up to about $\frac{1}{4}$ inch (6.3 cm). The tool is then used as a lever to chip pieces from the edge of the glass. The problem is that the tool has a considerable tendency to break the glass because of the nature of glass.

The plier used in the prior art has jaws which are flat, and contact each other along their full length when closed. This tool also has a tendency to crack the glass, and even when operated at its best, takes considerable time to remove a significant amount of material from the glass pane.

U.S. Pat. No. 316,430 to Derby shows opposing knife edges for splitting relatively large pieces of glass from a sheet. It is believed that this tool would also tend to break the glass because of the way that it cracks and is neither designed nor suitable for grozing applications. U.S. Pat. Nos. 331,812, 2,212,599 and 2,823,565 show conventional tools for breaking.

OBJECTS

It is therefore an object of the present invention to provide a shaping tool which rapidly shapes or trims an edge of a sheet of glass without cracking it. It is further an object to provide a method for using the tool. These and other objects of the present invention will become obvious to those skilled in the art by reference to the following description and the drawing.

IN THE DRAWING

FIG. 1 is a perspective view of the tool of the present invention illustrating partially in broken lines a preferred curved jaw surface V shaped opening into which an edge of a sheet of glass is to be inserted.

FIG. 2 is a front view of the preferred tool of FIG. 1, illustrating a glass edge inserted into the tool with the jaw surfaces open.

FIG. 3 is a front view showing the glass sheet with a chip or flake separated from it and with the jaws closed.

FIG. 4 is a cross-sectioned view of a modification of the tool wherein the jaws are rounded in the manner of two spoons placed back to back.

GENERAL DESCRIPTION

The present invention relates to a tool for nibbling at an edge of a glass sheet to rapidly remove material from the edge, either to shape or trim the sheet, without cracking the sheet which comprises a pair of hinged jaws each having opposed surfaces which are movable into contact with each other adjacent the hinge and remote from the hinge having jaw surfaces separated from each other to form a V when the jaws are closed wherein the jaw surfaces are movable at the hinge into contact with opposite corners at an edge of the sheet of glass to produce a scraping action at the corners to thus fracture or crack small flakes of glass from and form the edge. The invention also relates to the method of shaping an edge of a sheet of glass which comprises providing in contact with opposite corners of an edge of the sheet a tool having a pair of hinged jaws each having opposed surfaces which are movable into contact with each other adjacent the hinge and remote from the hinge having jaw surfaces separated from each other to form a V when the jaws are closed and moving the jaws at the hinge towards each other in contact with the corners so as to thus repeatedly crack small flakes of glass from the edge and change the shape of the edge. This action can be enhanced by concurrently moving the glass up and down between the jaws. This is because the tool functions in part by scraping the corner which pulls a flake from the glass sheet edge.

Preferably the tool of the present invention is in the form of hand operated pliers with a V shaped opening in the jaws. It will be appreciated that various vibrating means such as in electric fabric shears can be used to achieve the same result. Other mechanical means for moving the jaws can also be used. All of these variations will be obvious to those skilled in the art.

Generally the edges of sheet glass of all types can be shaped with the present invention. It works best with glass having a thickness between about 1/16" and $\frac{1}{4}$" (0.16 to 0.63 cm). But it is expected that by scaling up the overall dimensions of the tool, the desired result could be achieved on sheet glass ranging up to 1" in thickness. For contouring stained glass, narrower width jaws are used for ease of flake formation in tight inside curves. For trimming a straight edge on a sheet, wider jaws can be used. Also, the jaws can be rounded across their face like two spoons back to back for grozing very tight inside curves in stained glass sheets.

SPECIFIC DESCRIPTION

Referring to FIG. 1, a tool 10 is shown with a pair of jaws 11 and 12 supported by a pin or hinge 13 and integrally formed with handles 14 and 15 in the manner of scissors or shears. As shown in FIG. 1, the closed jaws have a curved open V between them even when the jaws 11 and 12 are closed which is generally designated by the number 16. FIG. 2 shows the jaws 11 and 12 in an open position with only the corners 17 and 18 of the edge of a sheet 19 in contact with opposing jaw surfaces 20 and 21. In FIG. 3, the jaws 11 and 12 are shown as closed with a chip or flake 22 removed. Repeated movement of the jaws 11 and 12 on the hinge 11 into contact with the edge nibbles small flakes of glass and forms the sheet into the desired contour or trims it to the desired size. FIG. 4 shows the cross-section of the jaws 19a and/or 19b with rounded surfaces 25 and 26 carrying outward in a V form hinge 27 as shown in FIGS. 2 and 3 which are used for cutting tight inside curves in stained glass. The jaw surfaces 23 and 24 are rounded perpendicularly of the V away from each other.

The tool of the present invention functions because glass will fracture at corners 17 and 18, releasing thin flakes 22 from the edge without cracking the remainder of the sheet 19. The inside surfaces 20 and 21 of the jaws 11 and 12 are preferably made of soft steel; impregnated with an abrasive or knurled to increase the abrading or scraping action at the edge 17 and 18 corners of the sheet 19 and thus facilitate formation of the flakes 22. Usually the prior art devices grasp one or both surfaces 19a and/or 19b of the sheet 19 inward of the corners 17 and 18 which can easily result in unwanted cracking of the sheet 19.

It is claimed:

1. A tool for nibbling at an edge of a glass sheet to rapidly shape or trim the sheet without cracking the sheet which comprises:
    (a) a pair of hinged jaws each having opposed flat first jaw surfaces extending from the hinge which move into contact with each other adjacent the hinge when the jaws are closed and remote from the hinge having second opposed jaw surfaces as extensions of the first jaw surfaces separated from each other to form an open V when the jaws are closed, wherein the jaw surfaces are movable at the hinge so that the second jaw surfaces are provided into contact with opposite corners at an edge of the sheet of glass to produce a scraping action at the corners to thus fracture small flakes of glass from and form the edge; and
    (b) means for moving the jaws about said hinge.

2. The tool of claim 1 wherein the second jaw surfaces curve away from each other to form the V.

3. The tool of claim 1 in the form of pliers with handles as the means for moving the jaws attached to each jaw to move the second jaw surfaces into contact with the corners.

4. The tool of claim 1 wherein the first and second jaw surfaces are soft steel.

5. The tool of claim 1 wherein the second jaw surfaces are constructed to abrade the corners of the sheet.

6. The tool of claim 1 wherein each of the second jaw surfaces are rounded across the surfaces of the V away from each other.

7. The method of shaping or trimming an edge of a sheet of glass which comprises:
    (a) providing in contact with opposite corners of an edge of the sheet a tool having a pair of hinged jaws each having opposed flat first jaw surfaces extending from the hinge which move into contact with each other adjacent the hinge when the jaws are closed and remote from the hinge having second opposed jaw surfaces as extensions of the first jaw surfaces separated from each other to form an open V when the jaws are closed; and
    (b) moving the jaws at the hinge towards each other with the second jaw surfaces in contact with the corners producing a scraping action at the corners so as to thus repeatedly fracture small flakes of glass from the edge and change the size or outline of the glass sheet.

8. The method of claim 7 wherein the glass is stained glass to be used in a window and wherein the sheet is gradually shaped in an inside or outside curve by repeated movement of the second jaw surfaces in contact with the corners of the edge.

9. The method of claim 7 wherein the glass sheet or the tool is moved upward and down between the second jaw surfaces while they are moved towards each other.

* * * * *